United States Patent
Palmer et al.

(10) Patent No.: US 6,924,253 B2
(45) Date of Patent: Aug. 2, 2005

(54) SCALE REMOVAL (76) Inventors: Bentley J. Palmer, 14410 S. 40th St., Phoenix, AZ (US) 85044; Diankui Fu, 1819 Brightlake Way, Missouri City, TX (US) 77459; Roger Card, 39, Rue de la Montagne de l'Esperon, Paris (FR), 75015; Matthew J. Miller, 3054 La Quinta Dr., Missouri City, TX (US) 77459

(*) Notice: Subject to any disclaimer, the term of this patent is extended or adjusted under 35 U.S.C. 154(b) by 425 days.

(21) Appl. No.: 09/829,110

(22) Filed: Apr. 9, 2001

(65) Prior Publication Data
US 2002/0055439 A1 May 9, 2002

Related U.S. Application Data (60) Provisional application No. 60/195,984, filed on Apr. 7, 2000.

(51) Int. Cl.[7] .............. E21B 21/00; C09K 3/00
(52) U.S. Cl. ............ 507/240; 507/203; 507/927; 166/312
(58) Field of Search ............... 507/203, 240, 507/927, 242, 237, 243, 277; 166/312, 300

(56) References Cited

U.S. PATENT DOCUMENTS

| | | | |
|---|---|---|---|
| 3,952,741 A | 4/1976 | Baker | 128/260 |
| 4,506,734 A | 3/1985 | Nolte | 166/308 |
| 4,624,754 A | 11/1986 | McManis, III et al. | 204/58.5 |
| 4,650,000 A | 3/1987 | Andreasson et al. | 166/307 |
| 4,670,166 A | 6/1987 | McDougall et al. | 252/8.552 |

(Continued)

OTHER PUBLICATIONS

Room–Temperature Molten Salts, 5 Adv. Molten Salt Chem. 185,188, by Hussey (1983).

(Continued)

*Primary Examiner*—Philip C. Tucker
(74) *Attorney, Agent, or Firm*—Robin Nava; Thomas O. Mitchell; Brigitte L. Echolz

(57) ABSTRACT

A method for treating a wellbore (or well casing) and the contiguous wellbore area to remove scale (mineral deposits comprised of, e.g., $BaSO_4$, $CaCO_3$, etc.) in the context of hydrocarbon recovery and other applications is disclosed, said method including contacting the scale with a fluid comprised of an ionic liquid or liquids.

7 Claims, 7 Drawing Sheets

U.S. PATENT DOCUMENTS

| | | | |
|---|---|---|---|
| 4,713,251 A | 12/1987 | Seighman | 426/96 |
| 4,741,401 A | 5/1988 | Walles et al. | 166/300 |
| 4,770,796 A | 9/1988 | Jacobs | 252/8.553 |
| 4,873,091 A | 10/1989 | Jankower et al. | 424/489 |
| 4,874,605 A | 10/1989 | Urban, Jr. et al. | 424/78 |
| 4,919,209 A | 4/1990 | King | 166/300 |
| 4,986,354 A | 1/1991 | Cantu et al. | 166/279 |
| 5,037,580 A | 8/1991 | Garcia et al. | 252/350 |
| 5,110,486 A | 5/1992 | Manalastas et al. | 252/8.551 |
| 5,164,099 A | 11/1992 | Gupta et al. | 252/8.551 |
| 5,227,182 A | 7/1993 | Song et al. | 426/5 |
| 5,258,137 A | 11/1993 | Bonekamp et al. | 252/356 |
| 5,437,331 A | 8/1995 | Gupta et al. | 166/300 |
| 5,551,516 A | 9/1996 | Norman et al. | 166/308 |
| 5,552,241 A | 9/1996 | Mamantov et al. | 429/103 |
| 5,611,962 A | 3/1997 | Garcia et al. | 252/350 |
| 5,731,101 A | 3/1998 | Sherif et al. | 429/102 |
| 5,827,602 A | 10/1998 | Koch et al. | 429/194 |
| 5,910,322 A | 6/1999 | Rivett et al. | 424/484 |
| 5,922,652 A | 7/1999 | Kowalski et al. | 507/129 |
| 6,350,721 B1 * | 2/2002 | Fu et al. | 507/242 |
| 6,608,005 B2 * | 8/2003 | Palmer et al. | 507/103 |

OTHER PUBLICATIONS

Johnathon G. Huddleston, et al. Room Temperature Ionic Liquids As Novel Media For 'Clean' Liquid–Liquid Extraction, Chem. Commun. 1765 (1998).

J. Fuller, et al., J. Chem. Soc. Commun. 299 (1994).

J. S. Wilkes and M. J. Zaworotko, J. Chem. Soc. Commun. 965 (1992).

K.R. Seddon, Room Temperature Ionic Liquids: Neoteric Solvents for Clean Catalysis 37 Kinetics and Catalysis 743, 746 (1996).

Charles L. Hussey, Room Temperature Haloaluminate Ionic Liquids Novel Solvents for Transition Metal Solution Chemistry, 60 Pure & Appl. Chem. 1763, 1765 (1988).

J.Sun, Room Temperature Molten Salts Based on the Quaternary Ammonium Ion, 102 J. Phys. Chem. 8858 (1998).

* cited by examiner

1-ethyl-3-methylimidazolium
tetrachloroaluminate 1-butylpyridinium nitrate 1-ethyl-3-methylimidazolium
tetrafluroborate 1-butylpyridinium
hexafluorophosphate

BmimIL-50

$C_8H_{15}AlCl_4N_2$
Exact Mass: 305.98
Mol. Wt.: 308.01
C, 31.20; H, 4.91; Al, 8.76; Cl, 46.04; N, 9.09

BmimIL-67

$C_8H_{15}Al_2Cl_7N_2$
Exact Mass: 437.87
Mol. Wt.: 441.35
C, 21.77; H, 3.43; Al, 12.23; Cl, 56.23; N, 6.35

EmimIL-50

$C_6H_{11}AlCl_4N_2$
Exact Mass: 277.95
Mol. Wt.: 279.96
C, 25.74; H, 3.96; Al, 9.64; Cl, 50.65; N, 10.01

EmimIL-67

$C_6H_{11}Al_2Cl_7N_2$
Exact Mass: 409.84
Mol. Wt.: 413.30
C, 17.44; H, 2.68; Al, 13.06; Cl, 60.05; N, 6.78

TMAHIL-67

$C_3H_{10}Al_2Cl_7N$
Exact Mass: 358.83
Mol. Wt.: 362.25
C, 9.95; H, 2.78; Al, 14.90; Cl, 68.51; N, 3.87

TEAHIL-67

$C_6H_{16}Al_2Cl_7N$
Exact Mass: 400.87
Mol. Wt.: 404.33
C, 17.82; H, 3.99; Al, 13.35; Cl, 61.38; N, 3.46

SCALE REMOVAL

REFERENCE TO RELATED PROVISIONAL APPLICATION

This patent claims the benefit under 35 U.S.C. 119(e) of U.S. Provisional application No. 60/195,984 file Apr. 7, 2000, and entitled "Scale Removal in Oilfield Applications."

TECHNICAL FIELD OF THE INVENTION

The invention relates to scale removal in hydrocarbon wells. In particular, this invention relates to methods for removing damaging scale, e.g., a scale of $BaSO_4$ or $CaCO_3$, from (1) a wellbore (or the casing lining the wellbore) drilled into a hydrocarbon-containing reservoir, or (2) the near-wellbore area of the hydrocarbon-containing reservoir.

BACKGROUND OF THE INVENTION

Hydrocarbons (oil, natural gas, etc.) are obtained from a subterranean geologic formation (i.e., a "reservoir") by drilling a wellbore that penetrates the hydrocarbon-bearing formation. In order for the hydrocarbons to be produced, that is, travel from the formation to the wellbore, and ultimately to the surface, at rates of flow sufficient to justify their recovery, a sufficiently unimpeded flowpath from the subterranean formation to the wellbore, and then to the surface, must exist or be provided.

A common reason for a decline in hydrocarbon production is the formation of scale in or on the wellbore and in the near-wellbore area or region of the hydrocarbon-bearing formation matrix. Generally, scale formation occurs from the precipitation of minerals, such as barium sulfate, calcium sulfate, and calcium carbonate, which become affixed to or lodged in the wellbore (or wellbore casing) and/or the near-wellbore matrix. Scale is generally produced from dissolved minerals carried in water which is unintentionally produced along with the desired hydrocarbon. When the water (and hence the dissolved minerals) contacts the wellbore or the near wellbore region, often accompanied by a significant change in pressure and/or temperature from its source in the formation, the dissolved minerals may begin to precipitate, forming scale. Not uncommonly, scale may form to such an extent that it can completely choke off a wellbore. In addition, the scale formed is often very hard, so that mechanical techniques for its removal, e.g., milling, are undesirable since they often damage the steel casing lining the wellbore. Prior art chemical methods of scale removal, such as injection of a solvent into the wellbore to contact the scale, are often ineffective against certain types of scale, particularly barium sulfate ($BaSO_4$) scale. Generally speaking, current commercial state-of-the art systems utilize ethylene diamine tetraacetic acid (EDTA). Numerous other systems have been proposed, studied, patented, and even field tested, but none of these systems has enjoyed widespread commercial success. Prior to the invention, therefore, no satisfactory or universally accepted solution has existed for the removal of $BaSO_4$ scale from a wellbore, or for the removal of $BaSO_4$ in combination with other types of scale.

SUMMARY OF THE INVENTION

The invention is directed to a method for removing scale from the wellbore environment and the near-wellbore area of a subterranean formation, and has particular application to the removal of scale comprising $BaSO_4$. The common denominator of each embodiment of the invention is that each involves the use of a class of compounds generally referred to as "ionic liquids". As understood herein, an "ionic liquid" is a compound which is a liquid at ambient temperatures and which consists entirely of a cation and an anion, or a substance which is a liquid at ambient temperatures and which consists entirely of cations and anions. Accordingly, an "ionic liquid" is to be distinguished from a (1) "molecular liquid" (e.g., carbon tetrachloride), and (2) a "solution" which contains dissolved electrolyte (e.g., $Na^+Cl^-$ in water). In the case of a quantity of an ionic liquid, the entire liquid is composed of cations and anions, i.e., it is a homogeneous liquid having those two components (hence also the expression "molten salts"). Thus, pure water would not qualify as an ionic liquid since it consists almost wholly of $H_2O$ molecules, rather than ions. Nor would $Na^+Cl^-$ solution qualify as an ionic liquid, since it is composed of $H_2O$ molecules and $Na^+$ and $Cl^-$ ions.

As the following text illustrates, several different modes of action possessed by ionic liquids may be exploited in the method of the invention. Not all modes of action are implicated in a given scale removal application, though some particular application may rely upon a number of modes of action and some applications may rely upon only one mode. Among the most important modes of action of the invention are: (1) dissolution of the scale by the ionic liquid; (2) heat formation upon ionic liquid generation; (3) ionic liquid utilization as a carrier solvent for another solvent or reactive agent; and (4) acid or super acid generation by reaction of the ionic liquid with water. The first mode of action, dissolution, exploits the excellent solubility characteristics of many ionic liquids to dissolve an extraordinarily broad range of materials, both organic (polar, non-polar, and charged, e.g., scleroglucan and xanthan polymer) and inorganic (e.g., calcium carbonate). In this case, the scale in the wellbore or the wellbore and near wellbore area or region is provided with or contacted with an effective amount of fluid or liquid which comprises at least a major portion of one or more of the ionic liquids which are solvent for the scale deposit(s) in the wellbore or near wellbore area. The solvent ability of a particular ionic liquid, or mixture thereof, i.e., its ability to dissolve scale is readily determined by routine testing, as illustrated hereinafter, and selection of a suitable ionic liquid or mixture thereof for the particular scale dissolution case is well within the skill of the art.

The second mode of action relies upon a unique feature of the synthesis of ionic liquids, namely, that substantial heat may be released during ionic liquid synthesis (depending upon the ionic liquid being synthesized). Accordingly, in this case, rather than the ionic liquids, the precursors of the ionic liquid or liquids are provided or pumped downwell separately, or substantially so, and allowed to react in the wellbore or wellbore and near wellbore area. This mode is particularly adapted to a coiled tubing operation for separate transmission of the precursors downwell. Not only is substantial heat generated (the inventors have found in laboratory testing that the quantity of heat released during the progress of this exothermic reaction is sufficient to melt paraffin, sludge, and wax, which are ubiquitous and which are very difficult to remove from wellbores), the ionic liquid formed is directly in contact with the scale in the wellbore or near wellbore area for ready dissolution thereof. In this case as well, i.e., where heat generation is the desired mode of action, those skilled in the art may select precursors providing the desired heat generation capability, this choice perhaps also being influenced by the properties desired in the reaction product.

Third, the ionic liquids comprising the fluids of the invention, again depending upon the particular species and the solute one has in mind, are excellent (e.g., highly stable, inert) solvents. Accordingly, the fluids can be used to transport a variety of agents or materials, including scale removal agents, as described hereinafter, particularly highly reactive substances such as strong or super acids (e.g., $HF+SbF_5$) to the scale deposit(s).

Fourth, some, though not all, ionic liquids generate extraordinary quantities of acid upon contact or reaction with an aqueous liquid. This mode of action can be exploited in applications that utilize acid in the attack of the scale in the wellbore or the wellbore and near wellbore area. As utilized herein, the expression "near wellbore area" refers to that area of a subterranean formation immediately adjacent a wellbore, perhaps several inches or so into the formation, as distinguished from significantly greater distances into the formation, a region often referred to as the "matrix".

As mentioned, more than one of these four mechanisms can be exploited in a single treatment. For example, an ionic liquid-based fluid of the invention which exhibits good scale solvency and which reacts with water can be provided in or pumped into a wellbore, the ionic fluid dissolving portions of the scale, e.g., carbonate, in the near wellbore region, thereby creating alternate flowpaths for hydrocarbon to move from the formation into the wellbore. Next, an aqueous fluid, such as fresh water, can be pumped into the wellbore to contact the ionic liquid, resulting in acid generation. The acid may then further degrade the scale as well as additionally attack polymer damage (e.g., scleroglucan, starch, xanthan—i.e., drilling fluid residue). Again, precursors used to prepare an ionic liquid or liquids, at least one of which reacts with water, can be injected into the wellbore and allowed to mix, forming the ionic liquid or liquids and resulting in heat generation, which will melt a first component of the contaminant deposit. Then, an aqueous liquid, e.g., fresh water, can be pumped into the wellbore, resulting in acid generation, for removal of a second component of the contaminant deposit.

The fluids of the invention will thus be formulated for the particular scale removal application to be performed and in accordance with the mode or modes of action desired. In general, the selection of a proper amount of ionic liquid used in a treatment fluid, as well as the selection of additive type (e.g., surfactant, acid, etc.), if present, and the total fluid volume, will be determined for each scale removal operation or procedure. Accordingly, in carrying out scale removal according to the invention, the amount of ionic liquid containing fluid supplied will be an effective amount, i.e., an amount sufficient to remove the scale to the degree desired in the wellbore or wellbore and near wellbore area. This will be true even in the second mode context where precursors are supplied, sufficient amounts or concentrations of precursors being provided to provide an amount of ionic liquid or mixtures thereof upon synthesis to achieve the desired effect. In some operations according to the invention, e.g., where dissolution is the primary effect desired, the treatment fluid may comprise "pure" ionic liquid, while, as mentioned previously, particular modes of operation may involve substantial concentrations of other components, as described more fully hereinafter. The only constraint on the concentrations or volumes of additional components present in the fluids, such as surfactants, encapsulated materials, etc., is that the "fluid" remain flowable. In this regard, it will be understood that "fluids" of the invention comprise flowable liquids, and, in some cases, foams, as distinguished from purely gaseous materials, except to the extent a gaseous additive or additives may be dissolved in the liquids of the invention. Additionally, as indicated, the fluids of the invention may comprise mixtures of one or more ionic liquids. Upon achieving the desired degree of scale removal, scale- and/or scale component-containing fluid is or may be removed from the wellbore or wellbore and near wellbore area.

DETAILED DESCRIPTION OF THE INVENTION

As indicated previously, as understood herein, the expression "ionic liquid" refers to a compound having the following characteristics:

liquid at "ambient temperatures"; and consisting solely of a cation and an anion.

Further, the expression "ambient temperatures" refers to temperature ranges that are likely to be encountered in the environment in which the ionic liquid containing or comprising fluids of the invention will be used. Hence, for scale removal treatments performed in Alaska, the ambient or surrounding temperature may be, e.g., –50° C. An ionic liquid comprising the fluids of the invention must be liquid at that temperature. Accordingly, the term "ionic liquid" is defined functionally, but specific examples are provided here to enable those skilled in the art to select and design a proper treatment regime using an ionic liquid-based fluid of the invention.

Figure 1:
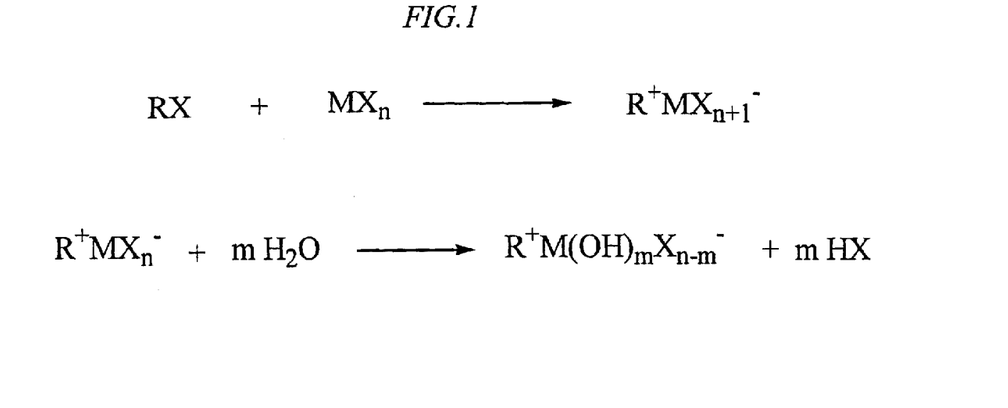
FIG. 1 is a general reaction schematic showing the preparation of an ionic liquid used in the invention (first reaction), and acid generation (second reaction).
Figure 2:
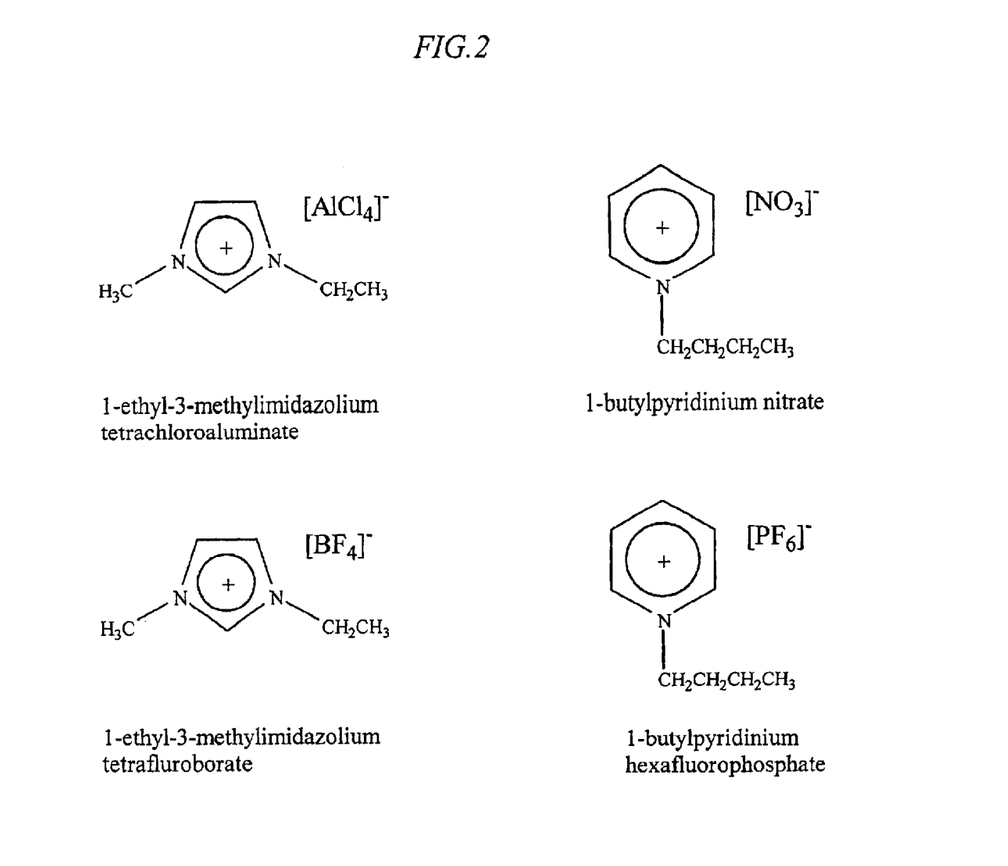
FIG. 2 illustrates four examples of ionic liquids employed in the fluids of the invention: 1-ethyl-3-methylimidazolium tetrachloroaluminate, 1-butylpyridinium nitrate, 1-ethyl-3-methylimidazolium tetrafluoroborate, and 1-butylpyridinium hexafluorophosphate.
Figure 3:
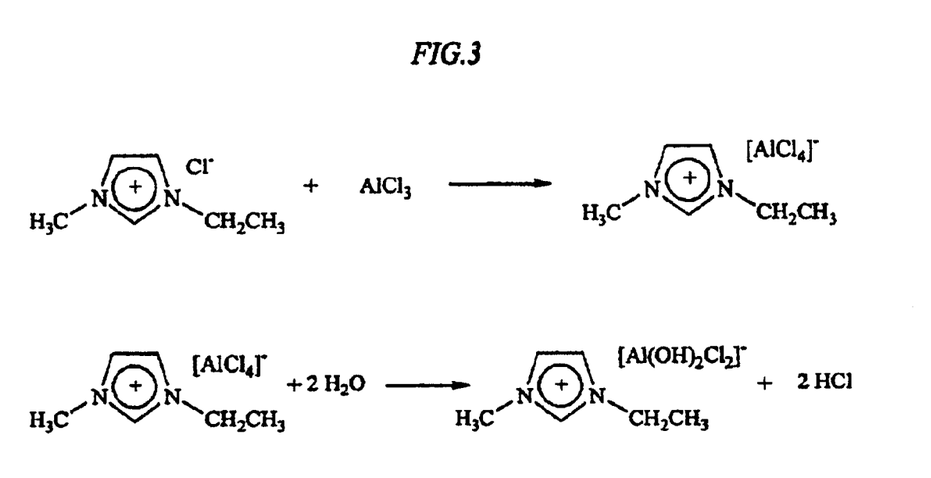
FIG. 3 illustrates 1-ethyl-3-methylimidazolium chloride reacting with aluminum trichioride to form 1-ethyl-3-methylimidazolium tetrachloroaluminate (first reaction) and the further reaction of that ionic liquid with water to form acid (second reaction).
Figure 4:
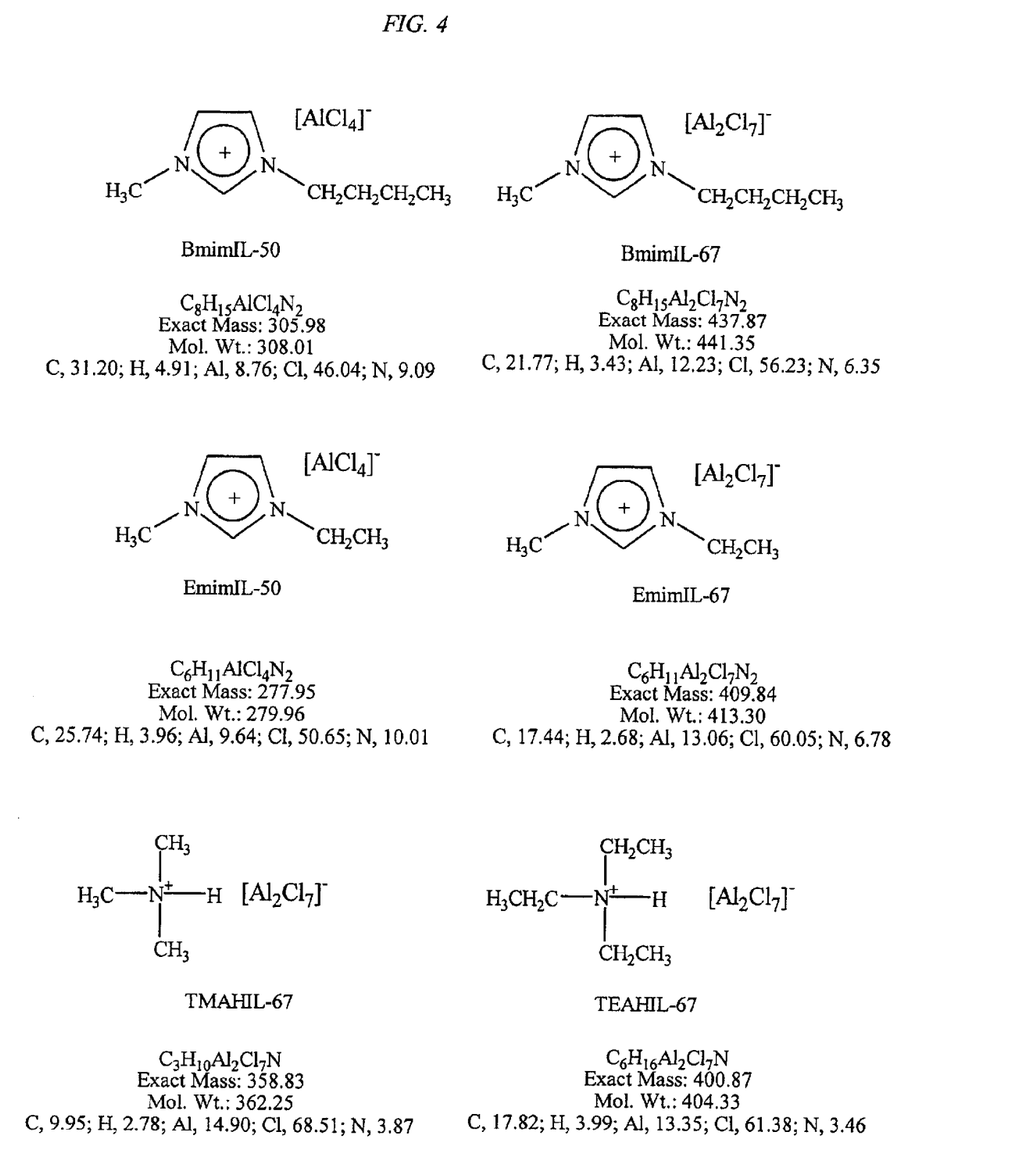
FIG. 4 shows several particularly preferred ionic liquids employed in the invention, further identified by laboratory designations for reference in the description hereinafter.

Ionic liquids are known compounds, and they and their preparation, per se, form no part of the present invention. In general, the particular ionic liquid to be employed in the invention may be selected by those skilled in the art according to the mode of action to be conducted and the circumstances of operation. For example, if a particular near wellbore matrix treatment requires precise zonal control, the treatment designer may select an ionic liquid of a given character, e.g., of more hydrophobic character. In such case, the ionic liquid may be selected from the ionic liquids comprising nitrogen-containing cations described in U.S. Pat. No. 5,827,602 (Koch et al). Many ionic liquids, useful in the practice of the invention, are the salts of or reaction products between nitrogen-containing compounds (providing the cations), such as heterocyclic nitrogen-containing compounds or amines and a Lewis acid or non-Lewis acid (providing anions). A generic equation for their preparation is shown in FIG. 1. Preferably, the nitrogen-containing compound is selected to provide the cation R from compounds having cations having the formulas wherein $R_1$, $R_2$, $R_3$, $R_4$, $R_5$, and $R_6$ are selected from H, F, and saturated and unsaturated hydrocarbon containing from 1 to 22 carbons, respectively, with the provision that the total number of carbon atoms contained by $R_1$, $R_2$, $R_3$, $R_4$, $R_5$, and $R_6$ (or $R_1$–$R_5$, or $R_1$–$R_4$) does not exceed 24; preferably, $R_1$, $R_2$, $R_3$, $R_4$, $R_5$, and $R_6$ being selected, respectively, from H and alkyl containing from 1 through 12 carbon atoms, with the same limitation of number of carbon atoms for $R_1$ to $R_6$ (or $R_1$–$R_5$, or $R_1$–$R_4$); and most preferably, H and alkyl containing 1 through 4 carbon atoms, respectively;

and from compounds having cations having the formula wherein $R_3$, $R_4$, and $R_5$ are selected from H, and saturated and unsaturated hydrocarbon containing from 1 to 22 carbons, respectively, provided that $R_3$, $R_4$, and $R_5$ are not simultaneously H, and with the further provision that the total number of carbon atoms contained by $R_3$, $R_4$, and $R_5$, does not exceed 24; preferably, $R_3$, $R_4$, and $R_5$, being selected from H and alkyl containing from 1 through 12 carbon atoms, respectively, with the same limitation of carbon atoms and provision regarding H; and most preferably, being selected from H and alkyl containing 1 through 4 carbon atoms, respectively, provided that $R_3$, $R_4$, and $R_5$ are not simultaneously H.

Particularly preferred ionic liquids are those in which the cation is N-alkylpyridinium or 1,3-dialkylimidazolium, with very preferred species being N-butylpyridinium and 1-ethyl-3-methylimidazolium. These two species have the formulas Also particularly preferred are ionic liquids in which the cations have the formula wherein $R_3$, $R_4$, and $R_5$ are the same or different and are selected from the group consisting of H, methyl, and ethyl, provided that $R_3$, $R_4$, and $R_5$ are not simultaneously H.

As indicated, the anions of the ionic liquids may vary widely, being selected from various Lewis acids and non-Lewis acids. The following anions are preferred constituents of ionic liquids comprising fluids of the invention: $BF_4^-$; $PF_6^-$; $SbF_6^-$; $CF_3SO_3^-$; $AlCl_4^-$; $RAlCl_3^-$, wherein R is alkyl containing 1 through 8 carbon atoms, preferably 1 through 4 carbon atoms; $R_2AlCl_2^-$, wherein R is alkyl containing 1 through 8 carbon atoms, preferably 1 through 4 carbon atoms; $CuCl_2^-$; $Cu_2Cl_3^-$; $Cu_3Cl_4^-$; $Al_2Cl_7^-$; $Al_3Cl_{10}^-$; $NO_3^-$; $(CF_3SO_2)_2N^-$; $Br^-$; $ClO_4^-$; $CH_3COO^-$; and $BPh_4^-$. $BF_4^-$ and $PF_6^-$ are preferred anions for ionic liquids for which water stability is desired, while $AlCl_4^-$ is a particularly preferred anion for ionic liquids to be used in acid-generation. Again, certain quaternary ammonium salts, in which the quaternary ammonium ion is large, i.e., wherein the total number of carbon atoms is greater than 20, are ionic liquids, and may be used.

The preparation of ionic liquids is well within the ambit of those skilled in the art, and most of the particularly preferred species discussed herein may be obtained commercially. Preparation of ionic liquids and disclosures of additional ionic liquid species which may be used in fluids of the invention are contained in Room-Temperature Molten Salts, 5 Adv. Molten Salt Chem. 185, 188, by Hussey (1983); U.S. Pat. No. 5,827,602, Hydrophobic Ionic Liquids, assigned to Covalent Associates Incorporated, 1998 (e.g., col. 6, Examples 1–3); U.S. Pat. No. 5,731,101, Low Temperature Ionic Liquids, assigned to Akzo Nobel N. V., 1998 (e.g., col. 3, Examples 1 and 2); U.S. Pat. No. 5,552,241, Low Temperature Molten Salt Compositions Containing Fluoropyrazolium Salts, assigned to Electrochemical Systems, Inc., 1996 (e.g., col. 9, Example 1); and U.S. Pat. No. 4,624,754, Ionic Liquid Compositions for Electrodeposition, G. McManis et al., inventors (unassigned), 1986 (e.g., col. 3, 1. 21). Each of these United States patents is hereby incorporated by reference in its entirety, and in particular those portions indicated following each reference.

Several attributes of the ionic liquids employed in the fluids of the invention are largely responsible for the advantages of the invention over conventional techniques. First, as mentioned, many ionic liquids are excellent solvents, and are characterized by good stability. This attribute allows ionic liquids to act as highly effective inert carrier solvents for very strong acids. Again, the exothermic nature of ionic liquid synthesis reactions will permit melting of contaminant layers coating wellbores. This possibility is particularly useful for materials that are resistant to acid degradation. And it is particularly useful in the case of a two-component contaminant layer—where one component is resistant to acid, but the other is not.

Further, some of the ionic liquids employed in the invention generate acid very slowly. The relatively slow acid generation of the ionic liquids of the invention is due primarily to a kinetic constraint, not a thermodynamic one. Accordingly, as mentioned, the rate of acid generation may be controlled by controlling water addition to the ionic liquid in the scale treatment operation. The ability of the ionic liquid used in the invention to generate acid slowly should not be confused with the incomplete acid generation of organic acids (e.g., acetic acids). Indeed, the fluids of the invention are far superior to organic acids in this regard. Moreover, at completion, one mole of a preferred species of the ionic liquids employed in the invention (e.g., the anion is $AlCl_4^-$) generates three moles of acid. By contrast, one mole of acetic acid generates, if dissociated fully, only one mole of acid.

Finally, many ionic liquids are hydrophobic. Because of this, fluids based on these ionic fluids exhibit excellent zonal control (or acid distribution)—that is, they have great affinity for hydrocarbon zones, hence they remain in the hydrocarbon-saturated zone, where the treatment is desired.

As mentioned previously, the ionic liquids used in the invention may further contain, as indicated, other components or agents dissolved therein, such as scale removal agents or materials, in suitable liquid transportable form. The blending of such components with the ionic liquids, as well as the formulation of such materials, is well within the ambit of those skilled in the art. Moreover, the invention is particularly suited to scale removal in which control or delay release mechanisms are employed in providing the ionic liquid or liquids, or precursors thereof, at a scale location. Such mechanisms may include encapsulating an ionic liquid or liquids, e.g., in impermeable membranes that 1) release when crushed, or 2) dissolve and release, and may also include encapsulating ionic liquid(s) in semi-permeable membranes that rupture because of osmotic swelling. The mechanisms may also include encapsulating ionic liquid(s) in a permeable membrane or coating that allows slow dissolution of the liquid through the membrane or coating, or encapsulating the ionic liquid(s) in a coating or substance that erodes, to release ionic liquid or liquids. Other possible techniques include placing the ionic liquid(s) in a porous matrix or grain, or forming a dispersion, or forming a micro-emulsion.

Delayed or controlled release mechanisms are particularly advantageous in utilization of precursors of an ionic liquid. For example, the precursors may be encapsulated for later release at the scale location, e.g., in the wellbore or near wellbore area. Upon release from the encapsulated particles, the precursors of the ionic liquid react and perform as described previously. Alternatively, one of the ionic liquid precursors might be sent to the scale area in a liquid containing the other or second precursor encapsulated in a suitable membrane that releases the second precursor at the scale location. In yet a further approach, the precursors may be suspended in a liquid phase, e.g., using a viscosifier(s), allowing for random collision and reaction at the scale location.

Various encapsulation methods and release mechanisms for encapsulated materials are known to those skilled in the art, and per se form no part of the present invention. For example, the ionic liquid, liquids, precursors, etc., of the invention, containing other components, may be encapsulated for utilization herein in permeable or impermeable membranes, imperfect membranes, osmotic membranes, slowly soluble elastomeric materials, erodible hydrocarbon enclosure materials, and encapsulants generated from microemulsion or macroemulsion, etc. For details regarding encapsulation of active ingredients (and releasing thereof), e.g., in a material such as in an impermeable membrane, see, for example, U.S. Pat. No. 4,506,734, Fracturing Fluid Breaker System Which Is Activated By Fracture Closure; U.S. Pat. No. 4,713,251, Process For Encapsulating Liquid Acids And Products; and U.S. Pat. No. 5,910,322 Delayed Release Pharmaceutical Formulation Contains Amoxycillin And Potassium Clavulanate. For details regarding encapsulating active ingredients in a material such as a semi-permeable membrane that ruptures because of osmotic pressure, see e.g., U.S. Pat. No. 3,952,741, Controlled Release Delivery System By an Osmotic Bursting Mechanism; U.S. Pat. No. 5,110,486, Breaker Chemical Encapsulated With A Crosslinked Elastomer Coating; and U.S. Pat. No. 4,741,401, Method for Treating Subterranean Formations. For details regarding encapsulating active ingredients in permeable membranes, see, e.g., U.S. Pat. No. 4,670,166, Polymer Article And Its Use For Controlled Introduction Of Reagent Into A Fluid; U.S. Pat. No. 5,164,099, Encapsulations for Treating Subterranean Formations and Methods For the Use Thereof; U.S. Pat. No. 4,770,796, Encapsulated Breaker For Crosslinked Acid Gel, Fracture Acidizing Fluid Containing Same, Method Of Use Thereof; U.S. Pat. No. 4,986,354, Composition And Placement Process For Oilfield Chemicals; and U.S. Pat. No. 5,922,652, Microencapsulated Oil Field Chemicals. For details regarding other control or delay techniques, see, e.g., U.S. Pat. No. 5,227,182, Method of Controlling Release Of Sucralose in Chewing Gum Using Cellulose Derivatives And Gum Produced Thereby; U.S. Pat. No. 5,611,962, Production Of Encapsulated Chemical Foaming Concentrates; U.S. Pat. No. 5,037,580, Endothermic Blowing Agents For Strengthening Weld Lines In Molded Thermoplastic Resins and Products; U.S. Pat. No. 4,873,091, Controlled Release Formulating Employing Resilient Microbeads; U.S. Pat. No. 5,437,331, Method For Fracturing Subterranean Formations Using Controlled Release Breakers And Compositions Useful Therein; U.S. Pat. No. 4,919,209, Method For Treating Subterranean Formations; U.S. Pat. No. 4,650,000, Acidizing Method Using Microemulsion; and U.S. Pat. No. 4,874,605, Stabilized Delayed Release Emulsion. Each of these United States patents is hereby incorporated by reference in its entirety and is specifically intended to indicate that employment of control or delay mechanisms or techniques is well within the capability of one skilled in the art.

Preferred Species

In this section, preferred ionic liquids are discussed. Representative literature references providing a more detailed discussion of the preferred species are provided where appropriate. Each such literature reference is hereby incorporated by reference in its entirety for the particular proposition mentioned immediately prior to each reference; moreover, the portion of the reference mentioned in the citation is particularly emphasized. Table 1 lists some physical properties of ionic liquids which are relevant to oilfield applications, for typical ionic liquids of the invention, and these are compared with physical properties of other substances that comprise traditional wellbore/matrix treatment fluids.

TABLE 1

| Physical Properties | Ionic Liquid | Acid (HCl, HF) | Organic Solvent (xylene, benzene) | Salt (NaCL) |
| --- | --- | --- | --- | --- |
| Liquid range | −90° C. to 300° C. | <−90° C. | −12° C. to 130° C. | >800° C. |
| Conductivity | Yes | Yes (only in $H_2O$) | No | Yes (>800° C. and in $H_2O$) |
| Solubility | Organic and $H_2O$ | $H_2O$ | Organic | $H_2O$ |
| Corrosion | Low | Very high | None | Low |
| Volatility | None | High | Very high | None |

Ionic liquids have a variety of properties that make them an ideal component in scale treatment fluids. First, preferred species of ionic liquids have a wide liquidus range that includes normal ambient temperature—in some cases this range is 300° C. See, e.g., Johnathon G. Huddleston, et al. Room Temperature Ionic Liquids As Novel Media For 'Clean' Liquid-Liquid Extraction, Chem. Commun. 1765 (1998). Additionally, the favorable viscosity and density characteristics of ionic liquids is likewise well-documented. See, e.g., J. Fuller, et. al., J. Chem. Soc. Commun. 299 (1994); J. S. Wilkes and M. J. Zaworotko, J. Chem. Soc.

Commun. 965 (1992). Other investigators have demonstrated the excellent thermal stability of ionic liquids, their lack of effective vapor pressure (Id.), and their ease of preparation. See, e.g., K. R. Seddon, Room-Temperature Ionic Liquids: Neoteric Solvents for Clean Catalysis 37 Kinetics and Catalysis 743, 746 (1996). Similarly, the extraordinary ability of certain species of ionic liquids to dissolve a broad range of moieties—organic, inorganic, polar, ionic, polymeric, and so forth—has also been well documented. Id.

For the invention technique involving acid generation, the skilled treatment designer would, for instance, consider the following variables: hydrophobicity, moles of acid produced per mole of ionic liquid, and the non-acid end product. Based upon these considerations, 1-ethyl-3-methylimidazolium tetrachloroaluminate and triethylamine dialuminum heptachloride are preferred species. For other techniques of the invention, the key characteristic of ionic liquids is not acid generation, but solvent capability. Hence, investigators have demonstrated that ionic liquids having as their anion either $BF_4^-$ or $PF_6^-$ are generally stable in the presence of water. See, e.g., Huddleston, et al., Chem. Commun. 1765. In particular, butylmethylimidazolium hexafluorophosphate is a demonstrably superior solvent. As evidenced by data recorded in the last-mentioned reference, it is a solvent comparable to the benchmark octanol, readily dissolving polar, non-polar, and even ionic species. Id. In addition, the inventors have found that 1-ethyl-3-methylimidazolium tetrachloroaluminate, a preferred ionic liquid of the invention, forms two phases with diesel at room temperature, and is fully miscible with diesel (a common component of well treatment fluids) at about 71° C. Selected particularly preferred species are shown in Table 2.

As mentioned, scales are precipitated mineral deposits, and also can form when incompatible waters combine, e.g., formation water and either a fluid filtrate or injection water. The most common type of scale is carbonate scale, such as $CaCO_3$, or $FeCO_3$, with $CaCO_3$ by far being the most common. The conventional prior art treatment for carbonate scale is HCl. The ionic liquids used in the preferred aspects of the invention are readily operable on carbonate scales. Other types of scale treatable by the fluids and techniques of the invention include chloride scales (e.g., NaCl), $BaSO_4$ scales, iron scales (e.g., FeS, $Fe_2O_3$), silica scales (e.g., $SiO_2$), and hydroxide scales (e.g., $Mg(OH)_2$). In certain instances, e.g., iron scale, the skilled engineer may wish to formulate a fluid of the invention that additionally comprises a reducing agent, or a sequestrant, such as EDTA. In the case of silica scale, a fluid of the invention may be prepared including HF.

It should be noted that in conventional acid treatments (e.g., HCl), asphaltene, paraffin, and sludge formation (i.e., organic deposits produced from inorganic acids and crude oil) is a persistent and costly problem. Hence, additives are often added to conventional acid fluids to prevent the formation of these substances. These additives are generally organic solvents (e.g., xylene, polar surfactants such as dodecylbenzene sulfonic acid). The ionic liquid-based fluids of the invention, in effect, contain their own intrinsic additive to control asphaltene and paraffin formation. This additive is in the form of the ionic liquids themselves, which also function as effective organic solvents.

The fluids of the invention can also be used to remove mixed deposits, e.g., blends of organic compounds and scales of either silts or clays. Indeed, the fluids of the invention are particularly suitable for removal of these

TABLE 2

| Preferred Species/Genus | Acid Generation | Solvent | Carrier Fluid | Literature Reference |
|---|---|---|---|---|
| 1-methyl-3-ethylimidazolium tetrachloro-aluminate | | | | Charles L. Hussey, Room Temperature Haloaluminate Ionic Liquids Novel Solvents for Transition Metal Solution Chemistry, 60 Pure & Appl. Chem. 1763, 1765 (1988). |
| 1-methyl-3-ethylimidazolium tetrabromo-aluminate | X | | | |
| Triethylamine dialuminumheptachloride | | X | | (continued) |
| Anion = $PF_6^-$, $BF_4^-$ | | X | X | J. G. Huddleston, et al. Room Temperature Ionic Liquids as Novel Media for 'Clean' Liquid-Liquid Extraction, Chem. Commun. 1765 (1998). |
| Butylmethylimidazolium hexafluoro-phosphate | | X | X | Id. |
| N-butylpyridinium tetrachloro-aluminate | X | | | Id. |
| N-alkylpyridinium tetrahalo-aluminates | X | | | Id. |
| Tetraalkylammonium [$(CF_3SO_2)_2N^-$] Where C < 12, with substantial chain dissymmetry | | | | J. Sun, Room Temperature Molten Salts Based on the Quaternary Ammonium Ion, 102 J. Phys. Chem. 8858 (1998). |
| IL's having as their anion, Bis(trifluoromethylsulfonyl) imide [$(CF_3SO_2)_2N^-$] | | | | (to depress the melting point of candidate IL's so that it approaches ambient range) J. Sun, Room Temperature Molten Salts Based on the Quaternary Ammonium Ion, 102 J. Phys. Chem. 8858 (1998). | mixed systems, since they provide a multi-function attack, as described previously. The skilled treatment designer can control whether the inorganic fraction (in contrast to the organic fraction) is attacked first by, for instance, manipulating the amount and rate of aqueous liquid addition to the ionic liquid. Again, the mixed deposit can be contacted first with a "pure" ionic liquid which should preferentially degrade the polymer fraction, and aqueous liquid can be injected to contact the ionic liquid, hence generating acid to degrade the inorganic portion.

A broad advantage of the fluids of the invention lies in their simplicity. In a conventional acid scale treatment system, numerous additives must be combined with the acid to inhibit corrosion, prevent organic deposits, eliminate emulsions, prevent iron precipitation, etc. In the ionic liquid-based fluids of the invention, the additive package may be far smaller than compared with conventional treatments, reducing the overall cost of these novel fluids, as well as making them much easier to pump. For instance, the most expensive and most common additive is a corrosion inhibitor. In the preferred fluids of the present system, a corrosion inhibitor is either not needed or may be needed in reduced concentrations. The reasons are: (1) acid formation from preferred species of ionic liquids generates a corrosion inhibitor (e.g., conventional corrosion inhibitors include nitrogen heterocycles); and (2) acid is not formed until water is added, and even then is formed very slowly, so that corrosion, particularly of above-ground components may be far less severe than with conventional systems in which acid is present throughout the entire pumping cycle.

In addition, many other common additives that are mixed with conventional acid-treatment fluids include organic polymers, e.g., surfactants, mutual solvents, etc. Many of the fluids of the invention are based on ionic liquids which are excellent, highly stable solvents miscible with and stable in the presence of many types of organic polymers. Moreover, to the extent that organic polymer-based additives merely mimic a property intrinsic to the ionic liquids of the invention, reduced amounts of these additives may be acceptable depending upon the particular application, or, in certain instances, they may be eliminated.

In other instances, it may be desirable to gel, or increase the viscosity of the treatment fluid. In this case, a preferred ionic liquid usable in the invention is 1-ethyl-3-methylimidazolium tetrachloroaluminate. This ionic liquid is not, however, miscible with guar, but is completely miscible therewith upon the addition of water. In addition, the ionic liquid-based fluids are compatible with viscoelastic surfactants. These can be used as gelling agents—i.e., to increase the viscosity of the fluids used in the invention. Preferred viscoelastic surfactants are disclosed in the following patents and patent applications, each of which is incorporated by reference in its entirety: U.S. Pat. No. 5,258,137, Viscoelastic Surfactant Based Foam Fluids, assigned to Schlumberger Technology Corporation, 1993; U.S. Pat. No. 5,551,516, Hydraulic Fracturing Process and Compositions, assigned to Schlumberger Technology Corporation, 1996; U.S. patent application Ser. No. 08/727,877, Methods of Fracturing Subterranean Formations, assigned to Schlumberger Technology Corporation, filed Oct. 9, 1996; U.S. patent application Ser. No. 08/865,137, Methods for Limiting the Inflow of Formation Water and for Stimulating Subterranean Formations, assigned to Schlumberger Technology Corporation, filed May 29, 1997; and U.S. patent application Ser. No. 09/166,658, Methods of Fracturing Subterranean Formations, assigned to Schlumberger Technology Corporation, filed Oct. 5, 1998.

EXAMPLE 1

Synthesis of Ionic Liquid and Acid Generation

Initially, an ionic liquid (IL) was prepared according to the following reaction schematic:

$$RX + MX_n \rightarrow R^+MX^-_{n+1}$$

where R is 1-ethyl-3-methylimidazolium, X is chloride, and $MX_n$ is $AlCl_3$. The two reagents were combined in a 1:1 molar ratio. Upon reaction, a liquid was produced. The reaction was highly exothermic. In the next step, acid was prepared from the product formed in the first reaction, simply by adding water to the reaction product, according to the following reaction schematic:

$$R^+MX_n^- + H_2O \rightarrow H^+ + X^- + RX + MX_{n-1}(OH); \text{ and}$$

$$MX_{n-1}(OH) + H_2O \rightarrow H^+ + MX_{n-2}(OH)_2 + X^-$$

The choices of M, R, and X are based on the criteria identified previously, in addition to the particular species also identified. What does matter is that an ionic liquid is formed. Again, as indicated previously, the precise composition of the ionic liquid—i.e., of the two components that make up the ionic liquid matter—can be varied depending upon the particular application. Modification or optimization of this sort is well within the knowledge of one skilled in the art of well treatment design and execution.

EXAMPLE 2

$CaCO_3$ Dissolution by Ionic Liquid-Based Fluid Compared With Dissolution by a Conventional System This example describes results of laboratory studies that demonstrate the efficacy of ionic liquids in dissolution of $CaCO_3$. In particular, the purpose of these studies was to compare the rate of $CaCO_3$ dissolution by an ionic liquid with that of HCl, a conventional treatment of choice.

First, the ionic fluid was prepared from the two starting materials: 1-ethyl-3-methylimidazolium chloride and aluminum trichloride. Both of these materials are in solid form at room temperature prior to mixing (the former is a crystalline substance; the latter, a powder). The two solid reactants were combined in about equimolar amounts (4.4 g imidazolium, F. W.=146.2; 4.0 g $AlCl_3$, F. W.=133.34 in a pyrex reaction vessel. The reaction began almost immediately with only modest shaking of the reaction vessel; within moments product ionic liquid, 1-ethyl-3-methylimidazolium tetrachloride, was formed, as evidenced by the transformation of all of the solids into a liquid. The liquid was a greenish color, due to contaminants present in the two starting materials. Without contaminants present, the ionic liquid product should be colorless. Upon combining the two starting materials, the reaction vessel promptly became hot to the touch, until it could no longer be handled through ordinary laboratory disposable plastic gloves. Substantial heat was generated throughout the reaction.

Upon recovery of the ionic liquid product, its ability to dissolve $CaCO_3$ was assessed and compared with the dissolution capability of HCl. More particularly, two 500 ml beakers each containing 25 to 30 ml. of deionized water were placed side by side. Each beaker was provided with a 1.1 g rectangular block of $CaCO_3$ at the bottom center thereof. Next, 5.7 ml of a 37% HCl solution was added to one beaker; and 6 ml of the ionic liquid prepared above was added to the other beaker.

Reaction of the HCl or ionic liquid with the respective blocks was confirmed by $CO_2$ generation, observed visually as bubbles rising to the surface of the water. $CaCO_3$ dissolution was far quicker in the HCl-containing beaker than in the beaker containing the ionic liquid. After a few minutes, the two beakers were shaken vigorously to enhance the dissolution rates, though this appeared to have no effect on the ionic liquid. After two hours, the $CaCO_3$ block in the HCl beaker had completely dissolved—100% dissolution. The block in the ionic liquid beaker had dissolved only 13% by weight. These results clearly demonstrated that the dissolution rate in the ionic liquid is relatively slow when compared with that of the HCl-containing solution.

Based on these data, a near wellbore matrix treatment with very long shut-in times—much longer than conventional shut-in times, which average about 12 hours—may be preferred. For example, shut in times of at least 24 hours, preferably at least 36 hours, may be employed to take advantage of the ionic liquids' slow reaction rate. Moreover, based on the preceding comparative example, the skilled treatment designer can make reasonable inferences about the concentration (or amount) of ionic liquid to use in an actual acid treatment.

EXAMPLE 3

$BaSO_4$ Scale Dissolution (Conventional Fluids Versus Ionic Liquid-Based Fluids)

Figure 5:
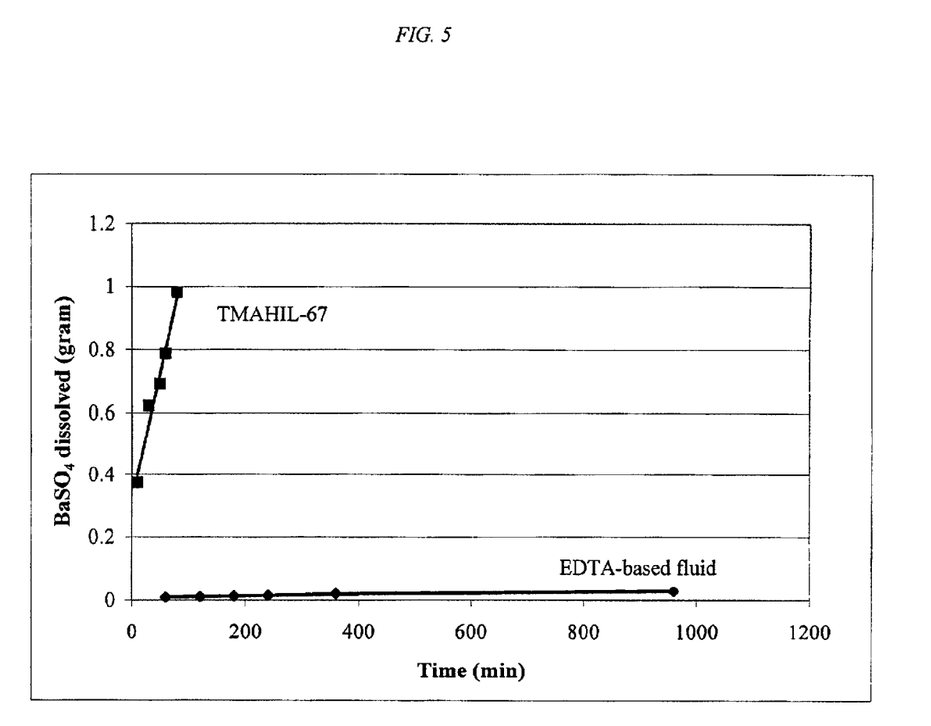
FIG. 5 illustrates laboratory results comparing the dissolution of $BaSO_4$ upon contact with a conventional system (an EDTA-based fluid), with the dissolution of $BaSO_4$ by an ionic liquid (IL) or fluid of the invention.

FIG. 5 is a graph illustrating laboratory results and comparing the dissolution of $BaSO_4$ upon contact with a conventional fluid (an EDTA-based fluid) with the dissolution of $BaSO_4$ by an IL-based fluid or a fluid of the invention. Each symbol represents a separate data point. The EDTA-based fluid was a 50% solution of $EDTA+K_2CO_3$. The IL-based fluid was pure trimethyl amine dialuminum heptachloride (TMAHIL-67). Equal weight percents of the IL-based fluid and the conventional fluid were used. Barium sulfate scale was simulated with 100–200 $\mu$m particles of $BaSO_4$. In particular, FIG. 5 shows grams of the $BaSO_4$ particles dissolved as a function of time. As evidenced by the two empirical curves, $BaSO_4$ scale dissolution (extent) was much greater in the presence of the IL-based system than in the presence of the conventional system. The upper-most datapoint for the IL-based fluid represents the dissolving capacity of this IL for $BaSO_4$, or 10 g $\mu$L to 2 g $BaSO_4$.

Solubility studies of a variety of different ionic liquid fluids were undertaken for further definition of the scope of the invention. The results of the studies are shown in Table 3. In the studies, the character of the ionic liquid was varied in three ways: cation type, anion type, and ratio of cation to anion. The shorthand names assigned to the ionic liquids in Table 3 reflect these variations. For instance, BMIMIL-50 signifies butylmethyl imidazolium aluminum-tetrachloride, BMIMIL-67 signifies a system comprised of the same cation, but a different anion (dialuminum heptachloride). In Table 3, the particular IL-based systems under study are listed in the left most column using this shorthand. The amount of IL used in each study was 29 grams (pure IL). Temperatures and contact times, respectively, are shown directly to the right of that column. The fourth column from the left indicates whether or not the particular study occurred under sonication, which is intended to simulate a flushing treatment rather than a static soak (both types are common in oilfield services applications). The fifth column indicates the type of scale (either $BaSO_4$ or $CaCO_3$). The sixth and seventh columns show the amount of the mineral sample added in grams (at the beginning of the study) and what remained after the time period indicated in column 3, respectively. The eighth column refers to the amount of mineral dissolved (subtracting column 7 from column 6); in column 9 that amount dissolved is expressed in percent (as percent dissolved). For comparison, a control experiment was conducted with $BaSO_4$ using a conventional system, in this case, an EDTA-based system. The control system dissolved about 1.5% of the $BaSO_4$ with which it came into contact, an amount which is used for comparison purposes.

TABLE 3

| Ionic Liquid | Temp (° C.) | Time (hr) | Sonication | Scale | Amount added (g) | Left (g) | Dissolved (g) | Dissolved % |
|---|---|---|---|---|---|---|---|---|
| TMAHIL-67(29 g) | 66 | 20 | No | $BaSO_4$ | 3.437 | 3.1287 | 0.3083 | 8.97 |
| TMAHIL-67(29 g) | 66 | 20 | Yes | $BaSO_4$ | 1.4228 | 0.9214 | 0.5014 | 35.24 |
| TMAHIL-67(29 g) | 79 | 20 | No | $CaSO_4$ | 1.6271 | 0.8903 | 0.7368 | 45.28 |
| TMAHIL-67(29 g) | 79 | 20 | No | $CaCO_3$ | 1.3991 | 1.0313 | 0.3678 | 26.29 |
| TEAHIL-67(29 g) | 66 | 20 | No | $BaSO_4$ | 2.2525 | 1.8234 | 0.4291 | 19.05 |
| TEAHIL-67(29 g) | 66 | 20 | No | $CaSO_4$ | 1.049 | 0.2607 | 0.7883 | 75.15 |
| TEAHIL-67(29 g) | 66 | 20 | No | $CaCO_3$ | 1.2355 | 0.6293 | 0.6062 | 49.07 |
| BMIMIL-50 | 66 | 24 | No | $BaSO_4$ | 2.339 | 2.3858 | −0.0468 | −2.00 |
| BMIMIL-67 | 66 | 24 | No | $BaSO_4$ | 1.252 | 1.22 | 0.032 | 2.56 |
| BMIMIL-50 | 66 | 24 | No | $CaCO_3$ | 1.3014 | 1.3404 | −0.039 | −3.00 |
| BMIMIL-67 | 66 | 24 | No | $CaCO_3$ | 1.1269 | 0.419 | 0.7079 | 62.82 |
| BMIMIL-50 | 79 | 20 | No | $BaSO_4$ | 2.9506 | 2.9495 | 0.0011 | 0.04 |
| BMIMIL-67 | 79 | 20 | No | $BaSO_4$ | 3.1166 | 2.9985 | 0.1181 | 3.79 |
| BMIMIL-50 | 79 | 20 | No | $CaCO_3$ | 2.8808 | 2.9917 | −0.1109 | −3.85 |
| BMIMIL-67 | 79 | 20 | No | $CaCO_3$ | 4.6452 | 3.4433 | 1.2019 | 25.87 |
| Control: (20 mL) | 66 | 20 | No | $BaSO_4$ | 3.4938 | 3.4388 | 0.055 | 1.57 |

Of the 15 separate studies (not counting the control), 11 ionic liquids performed better than the control. Most performed substantially better. The best-performing system was TEAHIL-67, or triethylamine dialuminum heptachloride. After 20 hours contact time, 29 grams of TEAHIL-67 dissolved 0.7883 grams of $CaSO_4$, or a little over 75% of the total sample. Also clearly evidenced from an examination of Table 3 is the broad spectrum of activity of the ionic liquids of the invention, e.g., $BaSO_4$ scale is readily dissolved (35%), as is $CaSO_4$ (45%), as is $CaCO_3$ (26%)—all with the identical IL chemistry (see rows 2–4).

Further, clearly shown in Table 3 is the rather broad range of different IL chemistries having scale-dissolution activity. For instance, the systems under study comprise two quite disparate cation types (one aromatic, one aliphatic) and two different anions ($Al_2Cl_7$, and $AlCl_4$). Indeed, based on the data presented, one of ordinary skill in the art could readily modify for instance, the cation backbones (imidazole and aliphatic tertiary amine) for particular needs.

A closer review of the data in Table 3 also indicates the effects of cation type and anion type. For instance, a comparison of row 1 with row 5 shows results from two systems with different cation type (methyl groups versus ethyl groups). From the data, it is evident that the IL with ethyl groups dissolved the solids slightly better than twice as well as the IL having methyl groups. Similarly, a comparison of rows 8 and 9 (and 14, 15) shows the effect on $BaSO_4$ dissolution from just a slight change in Lewis acid content.

Finally, the effect of cation type may be assessed. In general, the aliphatic systems performed better than the aromatic or imidazole-derivative systems, though not in every case. For instance, a comparison of row 4 with row 15 reveals similar performance.

EXAMPLE 4

Kinetics of $BaSO_4$ Scale Dissolution At Different Temperatures: (Conventional Fluids Versus Selected Ionic Liquid-Based Fluids)

Figure 6:
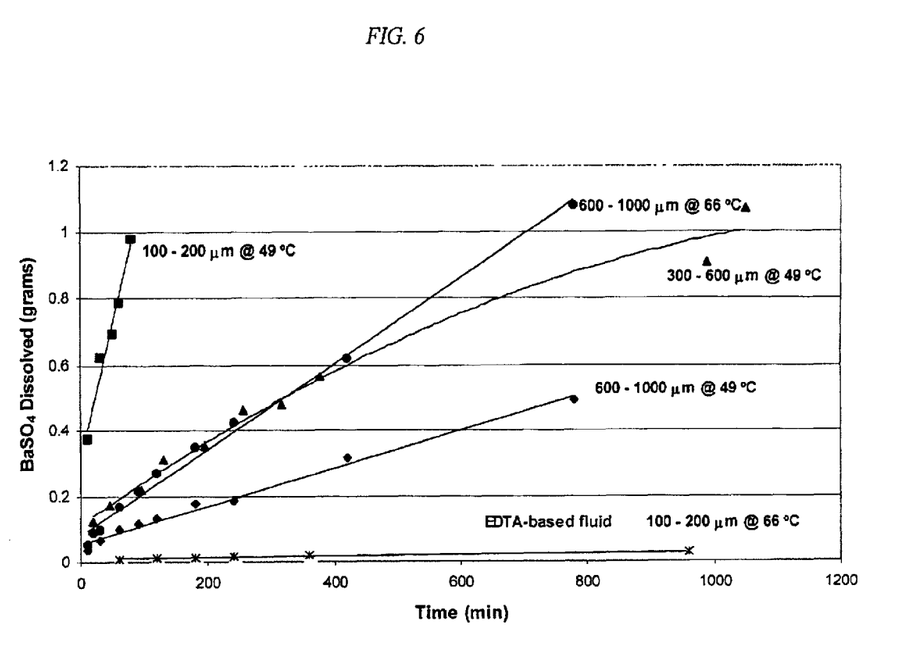
FIG. 6 illustrates laboratory results comparing the rate of dissolution of $BaSO_4$ upon contact with a conventional system (an EDTA-based fluid), with the dissolution of $BaSO_4$ by an IL or a fluid of the invention, and further illustrates dissolution of $BaSO_4$ by an IL or a fluid of the invention at different temperatures and using different $BaSO_4$ particle size distributions.

FIG. 6 is a graph illustrating laboratory results comparing, first, the rate of dissolution of $BaSO_4$ upon contact with a conventional system (an EDTA-based fluid) with the rate of dissolution of $BaSO_4$ upon contact with an IL fluid (TMAHIL-67) or a fluid of the invention. In this comparison, $BaSO_4$ particles size distribution was 100–200 $\mu$m. In addition, comparison plots are provided showing the effect of the IL at different temperatures, and using different $BaSO_4$ particle size distributions. In the graph, each symbol represents a separate data point. The IL fluid is pure trimethyl amine dialuminum heptachloride (TMAHIL-67). The EDTA-based fluid is a 50% solution of $EDTA+K_2CO_3$. Equal weight percentages of the IL and the conventional system were used.

FIG. 6 shows that the conventional system (EDTA), which is generally regarded as the fluid of choice in most $BaSO_4$ dissolution scenarios, is almost completely ineffective, while the IL of the invention provides good solubility. As also illustrated, ionic liquids dissolve smaller scale particles more quickly than larger ones, e.g., as evidenced by a comparison with the empirical curve defined by the squares (near the vertical axis) with the curve defined by the triangles. This comparison shows that a three-fold change in the particle size distribution has a substantial effect on $BaSO_4$ dissolution rate (e.g., 0.15 grams dissolved versus 0.6 grams dissolved after about 45 minutes). Indeed, even at lower temperature and even in the presence of much larger $BaSO_4$ particles, the ionic liquid is far superior to the conventional system. More particularly, after about 950 minutes, the conventional system failed to dissolve even about 0.05 grams of $BaSO_4$, whereas even at a lower temperature (same particle size distribution) the IL-based system achieved almost 10-fold greater dissolution after about 20 minutes. Indeed, in the case of the empirical curve to the far left (nearest the vertical axis) significant dissolution is achieved very rapidly, and continues, resulting in virtually complete dissolution in less than 100 minutes. Over that same time period, and under identical conditions, the conventional system has dissolved almost no $BaSO_4$.

Figure 7:
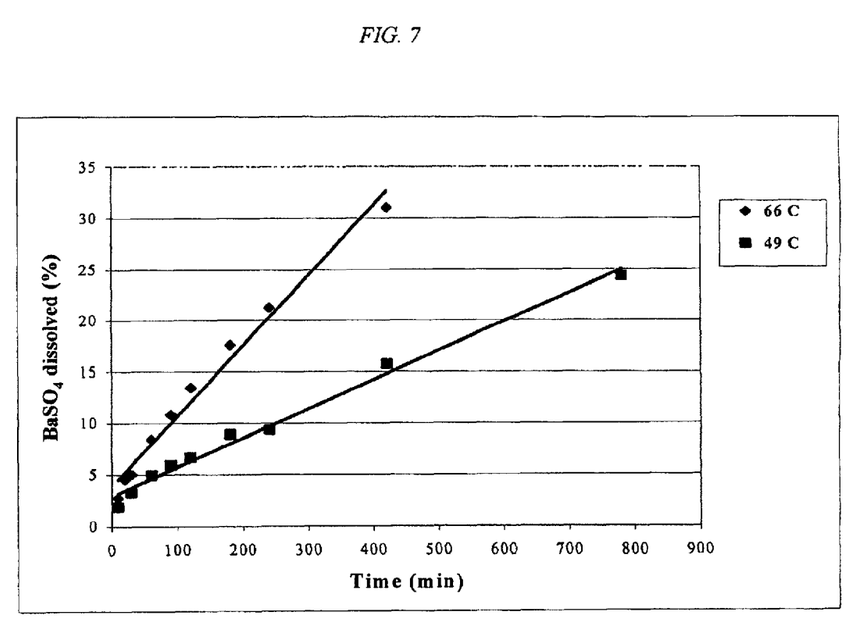
FIG. 7 illustrates laboratory results comparing the dissolution rate of $BaSO_4$ upon contact with an IL of the invention, at two different temperatures.

FIG. 7 is a graph illustrating laboratory results comparing the dissolution rate of $BaSO_4$ in the presence of an IL-based fluid of the invention (TMAHIL-67), at two different temperatures, fully corroborating the results in FIG. 6. While these data show significant variation in dissolution rate between about 49° C. and 66° C. (diverging over time), the ionic liquid is effective at dissolving $BaSO_4$ at both temperatures.

EXAMPLE 5

Thermodynamics of Scale Dissolution, Various Types (A Single Ionic Liquid-Based Fluid Contacted with Three Different Scale Chemistries)

Figure 8:
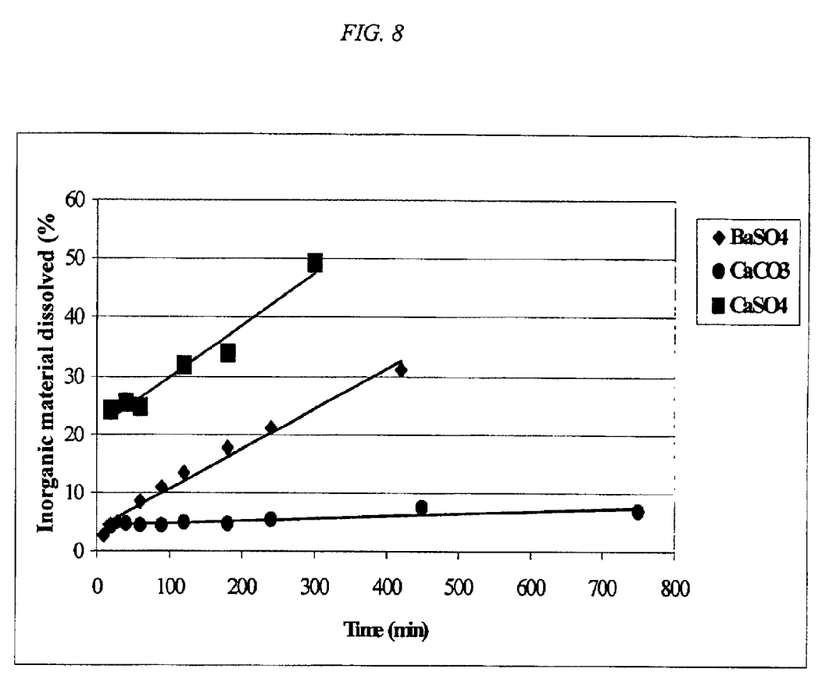
FIG. 8 illustrates laboratory results comparing the dissolution rate of three different types of common wellbore/matrix scales, at about 66° C.

FIG. 8 is a graph illustrating laboratory results comparing the dissolution rate of three different types of common wellbore/matrix scale, at about 66° C. The ionic liquid is again TMAHIL-67; and the $BaSO_4$ particles size distribution is 600–1000 $\mu$m. The results illustrated demonstrate that ionic liquids are suitable candidates for the dissolution of multiple types of scale common in oilfield environments, particularly $BaSO_4$ and $CaCO_3$.

The fluids of the invention provide several substantial advantages over state of the art fluids. For example, because many of the fluids of the invention have the unusual property that when they are combined with water or other aqueous liquid, an acid is generated, they may be pumped into the wellbore, followed by aqueous fluid, i.e., the aqueous fluid and ionic liquid can be combined within the wellbore. Since acid is not generated at the surface, pumps, storage tanks, well casings, etc., are not damaged by acid corrosion, as they are in conventional acid treatments. Second, even if the aqueous fluid and ionic liquid are combined at the surface and pumped downhole, acid generation is still considerably delayed, i.e. acid generation is relatively slow, as evidenced by laboratory results discussed, and corrosion of equipment will be minimized.

A third significant advantage of the invention is that acid generation, assuming that is the desired mode of action, can be carefully controlled. Because acid does not form until an ionic liquid is combined with aqueous fluid, acid generation can be increased or decreased by modifying the rate of addition of either of these components into the wellbore.

A fourth significant advantage of some of the ionic liquids relates to their low corrosivity. Commonly, a corrosion inhibitor is added to scale treatment fluids, and the corrosion inhibitor is a significant portion of the total expense of the treatment. For instance, dodecylpyridinium chloride and octylpyridinium bromide solutions are known corrosion inhibitors in matrix treatment fluids. In an unusual and remarkable aspect of the invention, upon addition of water to a particularly preferred ionic liquid of the invention, along with the acid generated, there is produced a pyridinium salt, 1-ethyl-3-methylimidazolium tetrachloaluminate, which is a proven corrosion inhibitor. Accordingly, preferred species of the ionic liquids employed in the invention may generate their own corrosion inhibitor, resulting in a major cost advantage of the ionic liquid-based fluids of the invention.

Finally, the discoveries of the invention, although focused primarily on wellbore applications, in some instances have wider application. Thus, the fluids of the invention, if circulated upwell from the wellbore or near wellbore area, will promote scale removal in pipe and surface equipment. Such equipment could also be treated directly for scale removal with the fluids of the invention, and the fluids of the invention are suitable for scale and sludge removal generally. In addition to oilfield utilization, the encapsulated ionic fluids of the invention will have a variety of uses. Moreover, as indicated particularly in the examples and drawings, the fluids of the invention are uniquely effective in dissolving $BaSO_4$. Finally, while the invention will have its greatest application in oilfield operations, it may also be utilized in water wells and related equipment.

What is claimed is:

1. A method for removing scale deposited in a wellbore or in the near wellbore area of a subterranean formation comprising contacting said scale with an effective amount of a fluid comprising an ionic liquid, or mixture of ionic liquids, solvent for said scale, wherein said ionic liquid of the fluid is comprised of cations having the formula in which $R_3$, $R_4$, and $R_5$ are selected from H, and saturated and unsaturated hydrocarbon containing from 1 to 22 carbons, respectively, provided that $R_3$, $R_4$, and $R_5$ are not simultaneously H, and further provided that the total number of carbon atoms contained by $R_3$, $R_4$, and $R_5$, does not exceed 24.

2. The method of claim 1, in which the anions are selected from $BF_4^-$; $PF_6^-$; $SbF_6^-$; $CF_3SO_3^-$; $AlCl_4^-$; $RAlCl_3^-$, wherein R is alkyl containing 1 through 8 carbon atoms; $R_2AlCl_2^-$, wherein R is alkyl containing 1 through 8 carbon atoms; $CuCl_2^-$; $Cu_2Cl_3^-$; $Cu_3Cl_4^-$; $Al_2Cl_7^-$; $Al_3Cl_{10}^-$; $NO_3^-$; $(CF_3SO_2)_2N^-$; $Br^-$; $ClO_4^-$; $CH_3COO^-$; and $BPh_4^-$.

3. A method for removing scale deposited in a wellbore or in the near wellbore area of a subterranean formation comprising contacting said scale with an effective amount of a fluid comprising an ionic liquid, or mixture of ionic liquids, solvent for said scale, in which said ionic liquid is trimethylammonium heptachlorodialuminate.

4. The method of claim 1 in which the ionic liquid comprises triethylamine dialuminum heptachloride.

5. A method for removing scale deposited in a wellbore or near wellbore area of a subterranean formation comprising providing an effective amount of an encapsulated fluid in the wellbore or near wellbore area, and releasing or allowing the fluid to be released in the wellbore or near wellbore area, the fluid comprising an ionic liquid, a mixture of ionic liquids, or precursors of an ionic fluid.

6. The method of claim 5 in which an ionic liquid of the fluid comprises nitrogen-containing cations, and anions of a Lewis acid or of a non-Lewis acid.

7. A method of dissolving $BaSO_4$ scale comprising contacting the $BaSO_4$ scale with a fluid comprising an ionic liquid or mixture of ionic liquids.

* * * * *